United States Patent [19]
Chi

[11] Patent Number: 5,002,407
[45] Date of Patent: Mar. 26, 1991

[54] HUB OF A BICYCLE
[76] Inventor: Yi C. Chi, No. 139-5, An Mei Rd., Mei Shan Tsun, Hou Li Hsiang, Taichung Hsien, Taiwan
[21] Appl. No.: 510,989
[22] Filed: Apr. 18, 1990
[51] Int. Cl.⁵ .................. F16C 13/00; F16C 43/04; B60B 27/00
[52] U.S. Cl. ................ 384/545; 301/105 B; 384/539
[58] Field of Search ............... 384/543–545, 384/539; 301/105 B, 105 R

[56] References Cited
U.S. PATENT DOCUMENTS

| | | | |
|---|---|---|---|
| 766,302 | 8/1904 | White | 301/105 B |
| 1,375,149 | 4/1921 | Haggerty | 384/545 |
| 3,858,942 | 1/1975 | Humlong | 384/545 X |

FOREIGN PATENT DOCUMENTS 1367662  6/1964  France ........................... 301/105 B Primary Examiner—Thomas R. Hannon
Attorney, Agent, or Firm—Dellett, Smith-Hill and Bedell

[57] ABSTRACT

A hub includes an axle. Each end of the axle has an annular groove and a longitudinal groove. A dust cap, two bearings and a cone are provided on each end of the axle. A clamping ring has a key extending inwards for engaging with the longitudinal groove of the axle. The clamping ring is tapered from an outer peripheral edge toward a center so that the clamping ring is resilient. A lock ring is engaged with each annular groove. The clamping rings stably retain the axle in place so that the axle do not move laterally.

1 Claim, 4 Drawing Sheets

HUB OF A BICYCLE

BACKGROUND OF THE INVENTION

The present invention relates to a hub, and more particularly to a hub of a bicycle.

The hub of a bicycle which is now in use is shown in FIG. 4. The hub comprises generally an axle A rotatably provided therein. The axle A has an annular flange F formed on each end portion thereof. Two dust caps D are threadedly connected to both ends of a hub shell (not shown). A bearing B is provided between each annular flange F and a respective dust cap D. A sealing ring L is provided around each end portion of the axle A close to the dust cap D. A lateral movement of the axle A is limited by the dust caps D only. When cycling, the dust caps D may be unthreaded and become loose due to vibration, shock or the like. Therefore, the wheels of the bicycle may rotate with a swinging motion or rocking motion.

The present invention has arisen to mitigate and/or obviate the afore-described disadvantages of the conventional hub of bicycles.

SUMMARY OF THE INVENTION

The primary objective of the present invention is to provide a hub of a bicycle, in which a main axle is stably held in a hub shell of the bicycle without making a lateral movement.

In accordance with one aspect of the invention, there is provided a hub which includes an axle having an annular flange, an annular groove and a longitudinal groove formed on each end portion. The longitudinal groove is formed between the annular flange and the annular groove. A dust cap has an inner annular flange integrally formed in a middle portion and is engaged in each end of the hub shell. A bearing is provided on each side of the inner annular flange of the dust cap. A cone is provided on an outer side of each outer bearing. A clamping ring has a key extending inwards for engaging with the longitudinal groove of the axle and two opposite lugs extending outwards for engaging with the notches of the cone. The clamping ring is tapered from an outer peripheral edge toward a center so that the clamping ring is resilient. A lock ring is engaged with each annular groove. The clamping rings stably retain the axle in place so that the axle does not move laterally.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
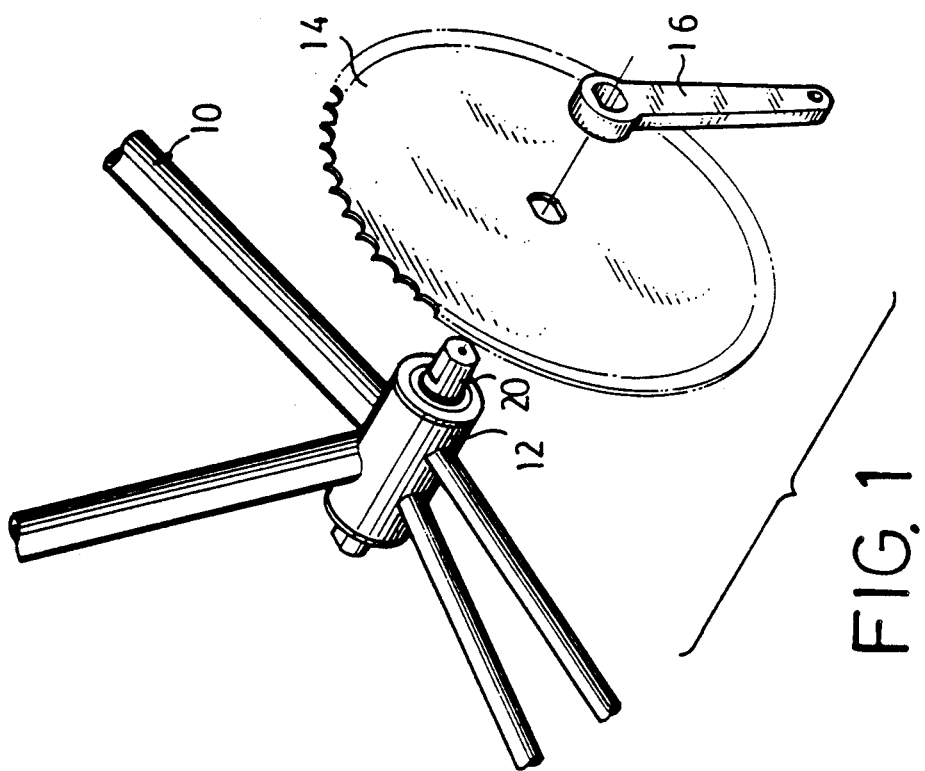
FIG. 1 is a partial exploded view of a hub of a bicycle in accordance with the present invention.

Referring to the drawings and initially to FIG. 1, the hub of a bicycle in accordance with the present invention comprises generally an axle 20 rotatably and longitudinally provided in a hub shell 12 of the bicycle 10. A sprocket 14 and two foot pedals 16 are disposed on the ends of the axle 20.

Figure 2:
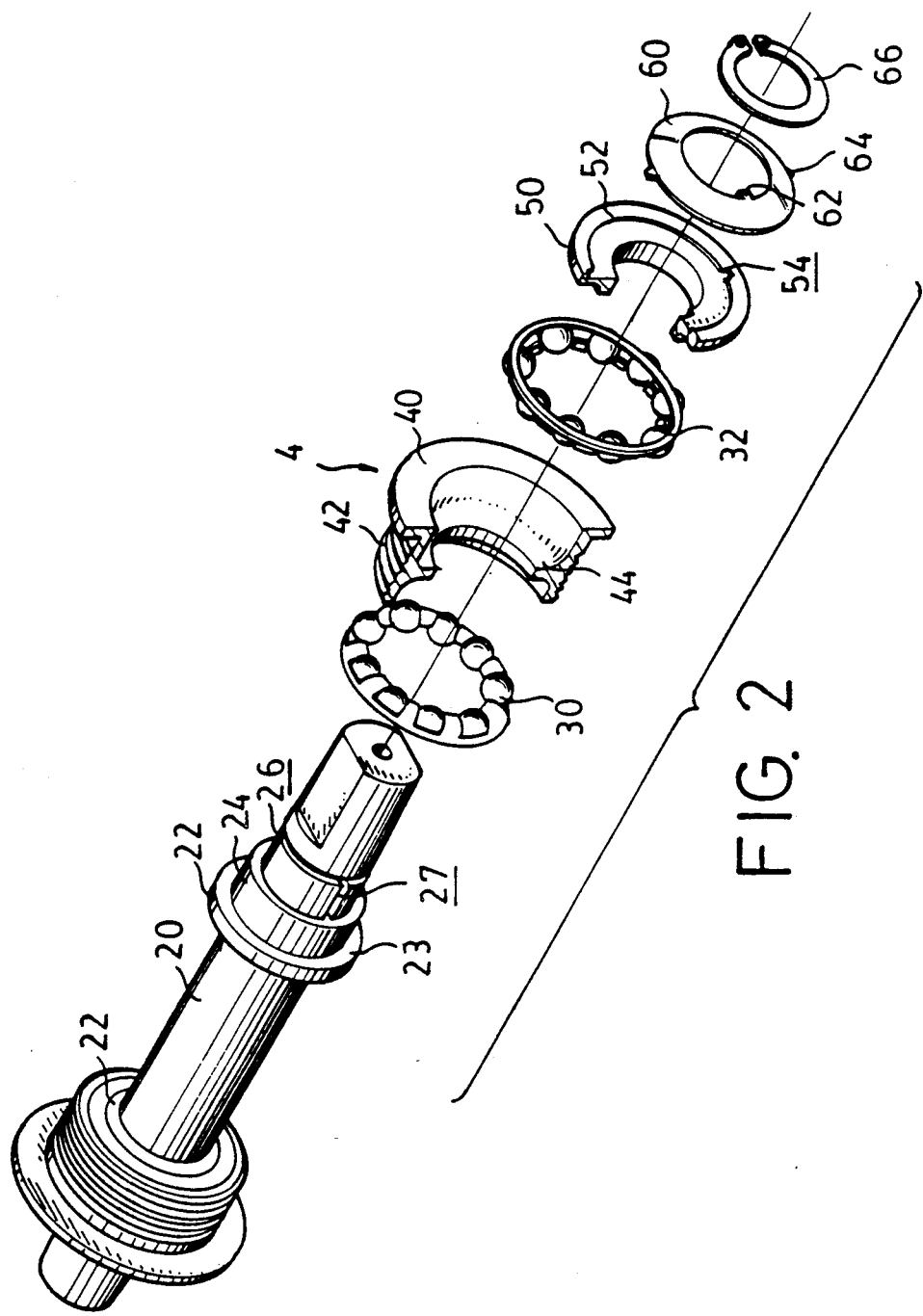
FIG. 2 is an exploded view of the hub.
Figure 3:
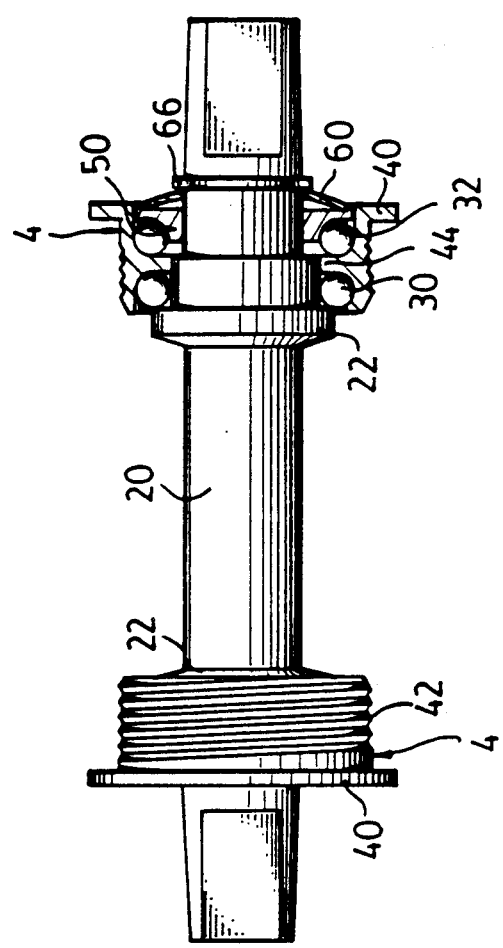
FIG. 3 is a partial cross sectional view of the hub.
Figure 4:
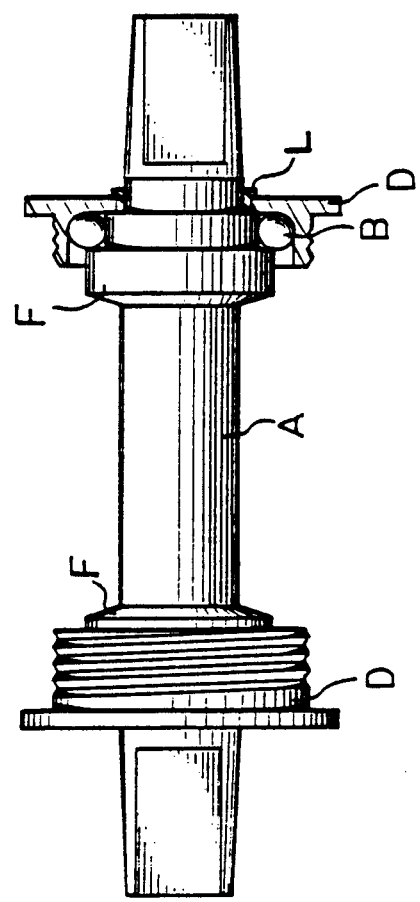
FIG. 4 is a partial cross sectional view illustrating a conventional hub.

Referring next to FIGS. 2 and 3, two sets of parts are separately provided on the axle 20, in which only one set of the parts is exploded as shown in FIG. 2, and only the set is shown in cross sectional view (FIG. 3). An annular flange 22 and a ring portion 24 are formed on each end portion of the axle 20 so as to form a shoulder 23 therebetween. An annular groove 26 is formed on each end of the axle 20 beside each ring portion 24. A longitudinal groove 27 is formed in the axle 20 between the ring portion 24 and the annular groove 26. A dust cap 4 has an annular flange 40 formed on one end thereof and an outer thread 42 formed on an outer peripheral surface thereof for threadedly engaging in each end of the hub shell 12. The annular flanges 40 of the dust caps 4 close both ends of the hub shell 12. The dust caps 4 surround the axle 20. An inner annular flange 44 is integrally formed in a middle portion of the dust cap 4. Two bearings 30, 32 are rotatably provided on both sides of the inner annular flange 44.

A cone 50 is provided on an outer side of the bearing 32. An annular flange 52 with two opposite notches 54 is formed on an outer surface of the cone 50. A clamping ring 60 has a key 62 extending inwards thereof, and two opposite lugs 64 extending outwards thereof. The key 62 is substantially 90 degrees apart from the lugs 64. The clamping ring 60 is tapered from an outer peripheral edge to a center thereof, as is best shown in FIG. 3. The key 62 is engaged in the longitudinal groove 27 of the axle 20, and the lugs 64 are engaged with the notches 54 of the cone 50 so that the axle 20, the cone 50 and the clamping ring 60 rotate in concert. A lock ring 66 is engaged in the annular groove 26 of the axle for retaining the parts in place.

Referring again to FIG. 3, the bearing 30 is disposed between the annular flange 22 of the axle 20 and the inner annular flange 44 of the dust cap 4, and the bearing 32 is disposed between the cone 50 and the inner annular flange 44 of the dust cap 4. The tapered configuration of the clamping ring 60 provides a resilience for the clamping ring 60 so that the clamping ring 60 resiliently clamps the parts, including the bearings 30, 32 and the cone 50, together.

Accordingly, the parts of the hub is accordance with the present invention are stably retained in place by the clamping rings 60 so that the axle 20 do not move laterally relative to the hub shell 12 and so that the wheels of the bicycle will not rotate in swinging motion or rocking motion.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hub of a bicycle comprising a hub shell; an axle being longitudinally provided in said hub shell, a first annular flange, an annular groove and a longitudinal groove being formed on each end portion of said axle, said longitudinal groove being formed between said first annular flange and said annular groove; a dust cap having an inner annular flange integrally formed in a middle portion thereof and being engaged in each end of said hub shell, said dust caps surrounding said axle; a first bearing being provided between each said first annular flange and a respective inner annular flange of said dust cap; a second bearing being provided on an outer side of said inner annular flange; a cone being provided on an outer side of each said second bearing, a second annular flange and two opposite notches being formed on an outer surface of each said cone; a clamping ring having a key extending inwards for engaging with said longitudinal groove of said axle and two opposite lugs extending outwards for engaging with said notches of said cone so that said axle, said cone and said clamping ring rotate in concert, said clamping ring being tapered from an outer peripheral edge toward a center thereof so that said clamping ring is resilient; a lock ring being engaged with each said annular groove; said clamping ring having an inner periphery engaging said lock ring; and said clamping rings stably retaining said axle in place so that said axle does not move laterally relative to said hub shell.

* * * * *